US011185207B2

(12) United States Patent
Mellinger, III et al.

(10) Patent No.: US 11,185,207 B2
(45) Date of Patent: Nov. 30, 2021

(54) MANAGING CLEANING ROBOT BEHAVIOR

(71) Applicant: QUALCOMM Incorporated, San Diego, CA (US)

(72) Inventors: Daniel Warren Mellinger, III, Philadelphia, PA (US); Stephen Marc Chaves, Philadelphia, PA (US); Michael Joshua Shomin, Philadelphia, PA (US); Matthew Hyatt Turpin, Waltham, MA (US); John Anthony Dougherty, Philadelphia, PA (US); Ross Eric Kessler, Philadelphia, PA (US); Jonathan Paul Davis, Philadelphia, PA (US); Travis Van Schoyck, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 16/043,663

(22) Filed: Jul. 24, 2018

(65) Prior Publication Data

US 2020/0029774 A1 Jan. 30, 2020

(51) Int. Cl.
*A47L 11/40* (2006.01)
*G05D 1/00* (2006.01)

(52) U.S. Cl.
CPC ....... *A47L 11/4061* (2013.01); *A47L 11/4011* (2013.01); *G05D 1/0088* (2013.01);
(Continued)

(58) Field of Classification Search
None
See application file for complete search history.

(56) References Cited

U.S. PATENT DOCUMENTS 4,335,847 A * 6/1982 Levine ............... G05D 23/1904
236/46 R
4,408,711 A * 10/1983 Levine ............... G05D 23/1913
165/270

(Continued)

FOREIGN PATENT DOCUMENTS

| CN | 106019965 A | 10/2016 |
| EP | 2252190 A2 | 11/2010 |
| WO | 2009097354 A2 | 8/2009 |

OTHER PUBLICATIONS

International Search Report and Written Opinion—PCT/US2019/037734—ISA/EPO—dated Sep. 23, 2019.

*Primary Examiner* — Bhavesh V Amin
(74) *Attorney, Agent, or Firm* — Michael F. Taveira

(57) ABSTRACT

Various embodiments include processing devices and methods for managing cleaning behavior by a cleaning robot. In some embodiments, a processor of the cleaning robot may obtain user planning information and user location information from one or more information sources external to the cleaning robot. The processor may analyze the user planning information and the user location information. The processor may determine one or more cleaning parameters for the cleaning robot based on the analysis of the user planning information and the user location information. The processor may generate an instruction for the cleaning robot to schedule an operation of the cleaning robot based on the one or more cleaning parameters. The processor may execute the generated instruction to perform the operation of the cleaning robot.

15 Claims, 7 Drawing Sheets

(52) U.S. Cl.
CPC .. *A47L 2201/04* (2013.01); *G05D 2201/0203* (2013.01); *G05D 2201/0215* (2013.01)

(56) References Cited

U.S. PATENT DOCUMENTS

| | | | | |
|---|---|---|---|---|
| 4,615,380 | A * | 10/1986 | Beckey | G05D 23/1904 165/239 |
| 4,674,027 | A * | 6/1987 | Beckey | G05D 23/1904 700/14 |
| 4,685,614 | A * | 8/1987 | Levine | F23N 5/203 236/78 D |
| 4,751,961 | A * | 6/1988 | Levine | G05D 23/24 165/238 |
| 5,995,884 | A * | 11/1999 | Allen | G05D 1/0225 701/24 |
| 6,658,325 | B2 * | 12/2003 | Zweig | B25J 9/1689 318/568.1 |
| 6,690,134 | B1 * | 2/2004 | Jones | G05D 1/0214 318/567 |
| 7,030,757 | B2 | 4/2006 | Matsuhira et al. | |
| 7,769,492 | B2 * | 8/2010 | Wang | G16H 40/67 700/257 |
| 8,095,238 | B2 | 1/2012 | Jones et al. | |
| 8,295,979 | B2 | 10/2012 | Thacher et al. | |
| 8,510,255 | B2 * | 8/2013 | Fadell | G06N 5/04 706/52 |
| 8,903,590 | B2 * | 12/2014 | Jeon | G05D 1/0274 701/25 |
| 9,008,835 | B2 * | 4/2015 | Dubrovsky | A47L 11/4011 700/245 |
| 9,233,472 | B2 * | 1/2016 | Angle | G06Q 20/202 |
| 9,380,922 | B2 * | 7/2016 | Duffley | G05D 1/0016 |
| 9,427,871 | B2 * | 8/2016 | Ciarelli | F16P 3/14 |
| 9,629,514 | B2 * | 4/2017 | Hillen | G05D 1/0274 |
| 9,713,871 | B2 | 7/2017 | Hill et al. | |
| 10,168,709 | B2 * | 1/2019 | Kleiner | A47L 9/0488 |
| 10,383,498 | B2 * | 8/2019 | Strazisar | A47L 9/2852 |
| 10,496,063 | B1 * | 12/2019 | Ebrahimi Afrouzi | G05B 19/0426 |
| 11,036,230 | B1 * | 6/2021 | Ebrahimi Afrouzi | G05D 1/0221 |
| 2006/0095158 | A1 * | 5/2006 | Lee | H04M 1/72533 700/245 |
| 2007/0250212 | A1 * | 10/2007 | Halloran | A47L 9/2894 700/245 |
| 2009/0037033 | A1 * | 2/2009 | Phillips | G05D 1/0278 701/2 |
| 2010/0145514 | A1 | 6/2010 | Kim et al. | |
| 2011/0264305 | A1 * | 10/2011 | Choe | G05D 1/0274 701/2 |
| 2012/0066168 | A1 * | 3/2012 | Fadell | G06N 5/048 706/52 |
| 2012/0229660 | A1 * | 9/2012 | Matthews | G05D 1/0038 348/207.11 |
| 2012/0259481 | A1 * | 10/2012 | Kim | G05D 1/0044 701/2 |
| 2012/0265370 | A1 * | 10/2012 | Kim | G07C 5/008 701/2 |
| 2013/0056032 | A1 * | 3/2013 | Choe | G05D 1/0044 134/18 |
| 2013/0060379 | A1 * | 3/2013 | Choe | B60L 50/52 700/245 |
| 2014/0124004 | A1 * | 5/2014 | Rosenstein | G06T 7/246 134/18 |
| 2014/0167931 | A1 * | 6/2014 | Lee | H04L 12/2818 340/12.5 |
| 2014/0207280 | A1 * | 7/2014 | Duffley | G05D 1/0016 700/257 |
| 2014/0207282 | A1 * | 7/2014 | Angle | G05B 15/02 700/257 |
| 2014/0330433 | A1 * | 11/2014 | Ciarelli | F16P 3/14 700/253 |
| 2015/0006016 | A1 | 1/2015 | Friedman et al. | |
| 2015/0283703 | A1 | 10/2015 | Izhikevich et al. | |
| 2015/0379118 | A1 | 12/2015 | Wickenkamp et al. | |
| 2016/0199977 | A1 | 7/2016 | Breazeal | |
| 2017/0008162 | A1 * | 1/2017 | Tsubota | G05B 19/00 |
| 2017/0283092 | A1 | 10/2017 | Brown et al. | |
| 2017/0303761 | A1 | 10/2017 | Chang | |
| 2017/0361468 | A1 | 12/2017 | Cheuvront et al. | |
| 2018/0005125 | A1 | 1/2018 | Fadell et al. | |
| 2018/0035606 | A1 * | 2/2018 | Burdoucci | A01D 34/84 |
| 2018/0061137 | A1 | 3/2018 | Jung | |
| 2018/0092499 | A1 * | 4/2018 | Strazisar | A47L 9/30 |
| 2018/0117769 | A1 | 5/2018 | Delazari et al. | |
| 2018/0137728 | A1 * | 5/2018 | Hahn | G08B 13/19697 |
| 2018/0194006 | A1 * | 7/2018 | Gu | G05B 15/02 |
| 2018/0272540 | A1 * | 9/2018 | Cronin | H04W 4/38 |
| 2018/0279847 | A1 * | 10/2018 | Park | A47L 11/4011 |
| 2018/0299899 | A1 * | 10/2018 | Suvarna | H04W 64/00 |
| 2018/0330475 | A1 * | 11/2018 | Tokatyan | G06K 9/00832 |
| 2019/0082918 | A1 | 3/2019 | Koetz | |
| 2019/0213438 | A1 | 7/2019 | Jones et al. | |
| 2020/0029768 | A1 * | 1/2020 | Mellinger, III | A47L 9/28 |
| 2020/0029771 | A1 * | 1/2020 | Mellinger, III | A47L 9/2894 |
| 2020/0029772 | A1 * | 1/2020 | Mellinger, III | A47L 9/2894 |
| 2020/0029774 | A1 * | 1/2020 | Mellinger, III | A47L 11/4061 |
| 2020/0033865 | A1 * | 1/2020 | Mellinger, III | G05D 1/0246 |

* cited by examiner

MANAGING CLEANING ROBOT BEHAVIOR

BACKGROUND

Autonomous and semiautonomous robotic devices are being developed for a wide range of applications. One such application involves robotic cleaning devices, or cleaning robots. Early cleaning robots were robotic vacuum cleaners that had various problems including colliding with objects and leaving areas uncleaned. More sophisticated cleaning robots have been developed since that time. For example, cleaning robots may be programmed to clean on a predetermined schedule, such as at certain dates and times. However, such cleaning robots blindly follow their cleaning schedule, and are unable to dynamically adapt their cleaning activities to environmental conditions.

SUMMARY

Various aspects include methods that may be implemented on a processor of a robotic vehicle for managing cleaning behavior by a cleaning robot. Various aspects may include obtaining, by a processor of a cleaning robot from an information source external to the cleaning robot, information useful for scheduling or modifying a cleaning operation, analyzing, by the processor, the information useful for scheduling or modifying a cleaning operation, determining, by the processor, one or more cleaning parameters for the cleaning robot based on the analysis of the information useful for scheduling or modifying a cleaning operation, generating, by the processor, an instruction for the cleaning robot to schedule an operation of the cleaning robot based on the one or more cleaning parameters, and executing, by the processor, the generated instruction to perform the operation of the cleaning robot.

In some aspects, obtaining from an information source external to the cleaning robot information useful for scheduling or modifying a cleaning operation may include obtaining, by the processor, user location information from a second information source external to the cleaning robot, and obtaining, by the processor, user location information from a second information source external to the cleaning robot. In some aspects, obtaining from an information source external to the cleaning robot information useful for scheduling or modifying a cleaning operation may include obtaining, by the processor, user planning information from a first information source external to the cleaning robot. In some aspects, obtaining user planning information from a first information source external to the cleaning robot may include obtaining, by the processor, the user planning information from a network element of a communication network.

In some aspects, determining the one or more cleaning parameters for the cleaning robot based on the analysis of the information useful for scheduling or modifying a cleaning operation may include identifying, by the processor based on the analysis of the user planning information, an event for which a cleaning operation should be scheduled, and scheduling a cleaning operation for the cleaning robot based on the identified event. In some aspects, determining the one or more cleaning parameters for the cleaning robot based on the analysis of the information useful for scheduling or modifying a cleaning operation may include determining, by the processor, a timing for the operation of the cleaning robot based on the identified event.

Some aspects may further include analyzing, by the processor, user communications information to obtain further information useful for scheduling or modifying a cleaning operation related to the identified event, and modifying the cleaning operation based upon the obtained further information. In some aspects, obtaining from an information source external to the cleaning robot information useful for scheduling or modifying a cleaning operation may include obtaining, by the processor, user location information from a second information source external to the cleaning robot. In some aspects, obtaining user location information from a second information source external to the cleaning robot may include obtaining, by the processor, the user location information based on a location of a mobile computing device associated with a user. In some aspects, obtaining user location information from a second information source external to the cleaning robot may include obtaining, by the processor, the user location information based on a location of a vehicle associated with a user.

In some aspects, obtaining user location information from a second information source external to the cleaning robot may include monitoring, by the processor, network communication activity with an external communication network, and determining, by the processor, the user location information based on the monitored network communication activity with an external communication network. In some aspects, obtaining user location information from a second information source external to the cleaning robot may include monitoring, by the processor, network communication activity of an internal communication network, and determining, by the processor, the user location information based on the monitored network communication activity of the internal communication network. In some aspects, determining the one or more cleaning parameters for the cleaning robot based on the analysis of the information useful in determining a current or future location of a user may include determining, by the processor, a timing for the operation of the cleaning robot based on the analysis of the user location information. In some aspects, generating an instruction for the cleaning robot to schedule an operation of the cleaning robot based on the one or more activity parameters may include determining one or both of a timing or a location for the operation of the cleaning robot based on the one or more cleaning parameters.

Various aspects further include a cleaning robot having a processor configured with processor executable instructions to perform operations of any of the methods summarized above. Various aspects further include a processing device for use in a cleaning robot and configured to perform operations of any of the methods summarized above. Various aspects include a cleaning robot having means for performing functions of any of the methods summarized above. Various aspects include a non-transitory processor-readable storage medium having stored thereon processor-executable instructions configured to cause a processor of a cleaning robot to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
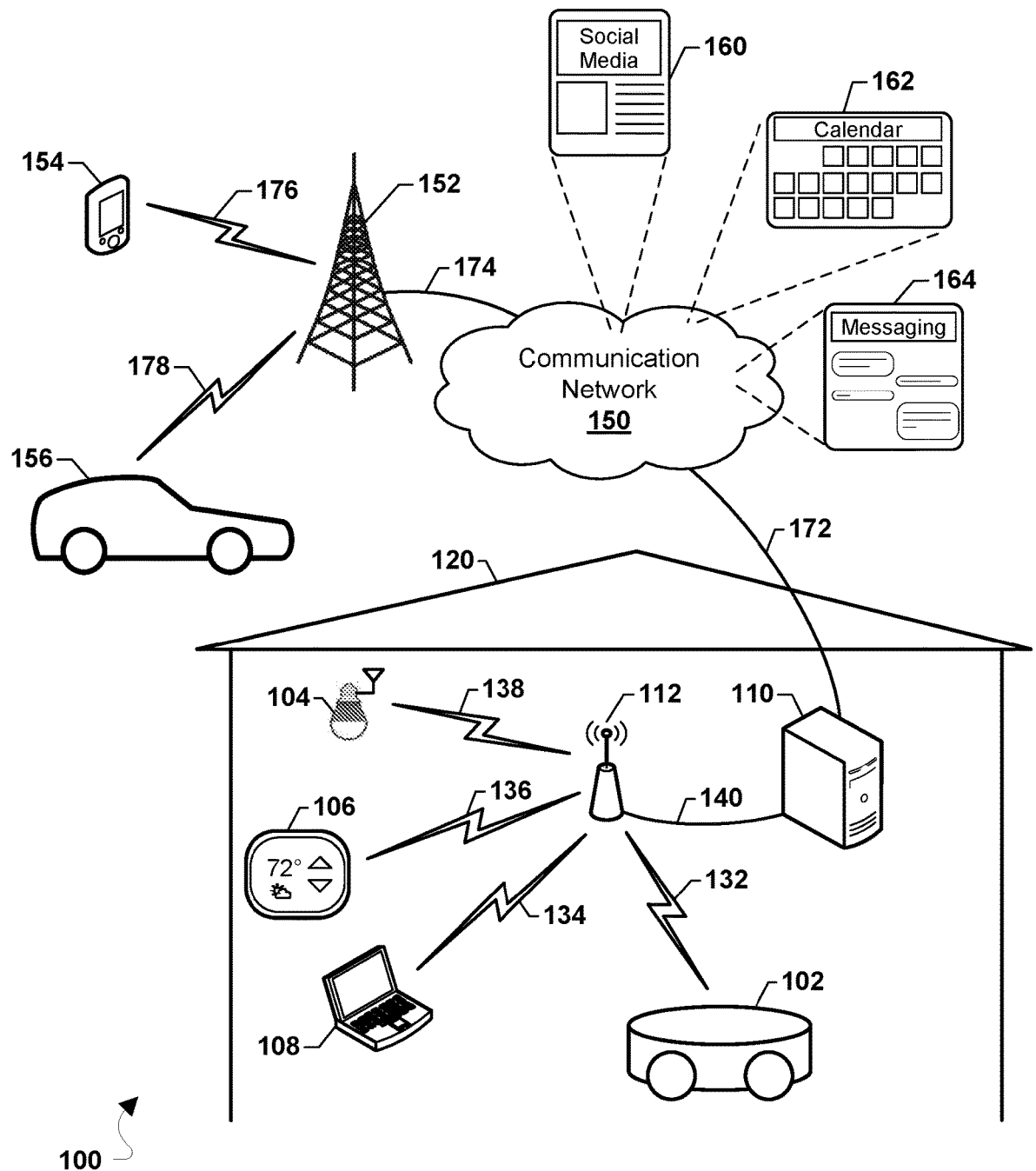
FIG. 1 is a system block diagram of a cleaning robot operating within a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a cleaning robot to enable the cleaning robot to dynamically adapt autonomous or semi-autonomous cleaning behaviors based on information obtained from sources external to the cleaning robot.

As used herein, the term "cleaning robot" refers to one of various types of devices including an onboard processing device configured to provide some autonomous or semi-autonomous capabilities. Various embodiments may be used with a variety of propulsion mechanisms, body designs, and component configurations, and may be configured to perform operations in a variety of environments, including airborne cleaning robots, and water-borne cleaning robots and/or some combination thereof. A cleaning robot may be autonomous including an onboard processing device configured to maneuver and/or navigate while controlling cleaning functions of the cleaning robot without remote operating instructions. In embodiments in which the cleaning robot is semi-autonomous, the cleaning robot may include an onboard processing device configured to receive some information or instructions, such as from a human operator (e.g., via a remote computing device), and autonomously maneuver and/or navigate while controlling cleaning functions of the cleaning robot consistent with the received information or instructions. A cleaning robot may include a variety of components that may perform a variety of cleaning functions. Various embodiments may be performed by or adaptable to a wide range of smart cleaning appliances, including smart dishwashers, washing machines, clothing dryers, garbage collectors/emptiers, and other suitable smart cleaning appliances. For conciseness, term "cleaning robot" will be used herein.

Conventional cleaning robots may be programmed to clean on a predetermined schedule, such as at certain dates and times. However, such cleaning robots blindly follow their cleaning schedule, and are unable to dynamically adapt their cleaning activities to environmental conditions and presence, actions and/or plans of humans.

Various embodiments provide methods, and cleaning robot management systems configured to perform the methods of managing cleaning robot behavior to improve the effectiveness of cleaning operations and/or reduce interference with humans. Various embodiments enable a processor of a cleaning robot to dynamically adapt autonomous or semiautonomous behavior of the cleaning robot using information from sources external to the cleaning robot. Various embodiments improve the operation of the cleaning robot by enabling the processor of the cleaning robot to dynamically adjust a date, time, a frequency, a location, and other suitable parameters of one or more operations of the cleaning robot based on an analysis by the processor of the cleaning robot of information from one or more information sources external to the cleaning robot, information useful in determining a current or future location of a user. Various embodiments improve the operation of the cleaning robot by enabling the processor of the cleaning robot to draw inferences based on an analysis of information from the information sources external to the cleaning robot, and to dynamically adjust one or more aspects of operations of the cleaning robot (including scheduling parameters) based on the inferences determined by the processor of the cleaning robot.

In various embodiments, the processor of the cleaning robot may obtain from an information source external to the cleaning robot information that is useful in scheduling and/or configuring one or more cleaning operations. In some embodiments, the information that is useful in scheduling and/or configuring one or more cleaning operations may include determining a current or future location of a user, determining plans and/or presence of a user of the cleaning robot from an information source external to the cleaning robot, and determining scheduled events that may warrant particular cleaning operations before and/or after the events.

In some embodiments, the cleaning robot may be configured to communicate with a communications network (e.g., via a wireless communications device such as a Wi-Fi access point of a user's home or office network with a connection to the Internet) to obtain a user's planning information from a network element (e.g., a server or other network element) of the communication network. For example, the processor of the cleaning robot may obtain calendar information from a calendar data file associated with a user of the cleaning robot that is accessible via the network element. As another example, the processor may obtain an indication of a planned or future event from a social media service associated with a user of the cleaning robot that the processor of the cleaning robot access via the communication network. As another example, the processor may obtain information about an upcoming event from a messaging service of a user and analyze the content of one or more messages to obtain information regarding the event useful for scheduling or modifying cleaning operations (e.g., type of event, number of guest, particular guest or guest requirements, and the like). In some embodiments, the processor may access and use information from two or more network services in combination. For example, the processor may relate content from the messaging service or the social media service (e.g., discussing an upcoming event) to a calendar item in the network calendar (e.g., calendar data for the upcoming event), such as to determine the number of people attending, special considerations of some attendants (e.g., allergies requiring special cleaning operations), etc. In some embodiments, the processor may obtain the user planning information from a computing device, such as a personal computer or mobile computing device, that is accessible via a local communications network, such as a home wireless (e.g., WiFi) network, an Internet of Things (IoT) network, or another suitable communications network.

In some embodiments, the processor of the cleaning robot may obtain user location information from a source external to the cleaning robot. In some embodiments, the cleaning robot may obtain user location information from or about a device that is typically closely associated with a user, such as a smartphone, or a vehicle typically used by the user. For example, the portability and functionality of smartphones means that the location of such a smartphone is typically close to the user of the smartphone. Such devices differ from presence sensors that may be deployed in a home, workplace, or other location, because presence sensors are typically not associated with a user, and typically remain in a static location so such sensors can only report whether a user is present or not.

In some embodiments, the processor of the cleaning robot may obtain user location information of a mobile computing device, such as a smartphone. In some embodiments, the processor may obtain user location information from or about a vehicle typically used by the user. In some embodiments, the location of the mobile computing device and/or the vehicle may provide a strong indication of whether a user is or is not at a location, such as home, work, or another location.

Using location information from such devices, the cleaning robot processor may make determinations or inferences about the user's location as well as how long the user may be at the location, or in transit to and/or from the location. For example, based on the location information of the device, the processor of the cleaning robot may infer that the user of the device is/in, near or away from the structure in which the cleaning robot operates. As another example, the further the device is from the structure, the longer the user is likely to be away from the structure.

In some embodiments, the processor may determine or infer how long a user may be away from the structure based on the location information. For example, the processor may determine that the user's smartphone and/or vehicle are en route to, or are located at the user's place of work, and the processor may determine from the device location information that the user will be away from the structure for the duration of a typical work day, e.g., approximately eight hours. As another example, the processor may determine that the user's smartphone and/or vehicle are at the local soccer field, and the processor may determine from the device location information that the user will be away from the structure for at least the duration of their child's scheduled soccer practice, e.g., approximately 90 minutes.

In some embodiments, the processor may obtain the user location information by monitoring network communication activity. In some embodiments, the processor may monitor network communication activity from a location with an external communication network. For example, the processor may communicate with, and may monitor network traffic passing through, a communication hub device, a router, a gateway, or similar network device. In some embodiments, the processor may determine the user location information based on the monitored network communication activity with the external communication network. For example, the processor may detect Internet use, uploading or downloading of information, streaming of media, network audio or video communications (e.g., VoIP communications, real-time video chatting, or other similar communications), or another suitable network usage. In some embodiments, the processor may monitor communications with the hub device or with one or more devices in a location (e.g., an IoT device) from outside the location (e.g., communications from a mobile computing device at a remote location with a smart lighting device or a smart thermostat device at a location). In some embodiments, the processor may determine whether a user or users are present at a location based on the monitored network communication activity with the external communication network.

In some embodiments, the processor may monitor network communication activity of an internal communication network. For example, the processor may monitor network communications (e.g., over a smart home network) generated by the use of a smart appliance or smart device, such as a smart lighting device, smart thermostat, smart fan or air circulator, an IoT device, or another network device. As another example, the processor may monitor machine-to-machine communications over the internal communication network. In some embodiments, processor may monitor network traffic passing through a communication hub device, a router, a gateway, or another network device. In some embodiments the processor may monitor direct communications between or among devices that do not pass through a communication hub device. In some embodiments, the processor may determine whether people are present at a location based on the monitored network communication activity over the internal communication network.

In some embodiments, the processor of the cleaning robot may analyze the information that is useful in scheduling and/or configuring one or more cleaning operations, such as user planning information and/or user location information. In some embodiments, the processor of the cleaning robot may employ one or more analysis processes to analyze the information that is useful in scheduling and/or configuring one or more cleaning operations, including user planning information and/or the user location information, such using machine learning techniques. In some embodiments, the processor may generate and store in memory one or more analyses of such obtained information. In some embodiments, the processor may apply one or more machine learning techniques to the obtained information to determine information useful for scheduling and/or configuring a cleaning operation. For example, the processor may obtain information regarding an upcoming event for one or more users, a location for one or more users, communications with a user from others (e.g., RSVPs or special need requests), and other information determinable from the user planning information, user communications, and user location information.

In some embodiments, the processor may correlate, combine, or supplement user planning information, user location information, and/or user communications or social media based on information obtained from two or more network-available services. In some embodiments, the processor may use information from a network calendar, a social media service, and/or communication service in combination for scheduling and adjusting cleaning operations. For example, the processor may obtain from the user's network calendar information about a scheduled event, such as a party, and the processor may obtain from a social media service and/or a communication service information from a discussion with the user regarding the upcoming party. In some embodiments, the processor may analyze the content of user communications (e.g., from the communication service and/or the social media service), such as an invitation sent by the user for an event, replies to the invitation sent to the user, and other content of user communications to obtain further information about an event that may be relevant to scheduling and modifying cleaning operations.

In some embodiments, the processor may analyze the communication content to obtain further information relevant to scheduling and modifying cleaning operations. For example, from the phrase "bring your bathing suit" in a user communication to guests, the cleaning robot processor may determine that a swimming pool may be used during the upcoming event, and therefore a pool clean operation before and/or after the event may be scheduled. As another example, a guest may indicate in an RSVP message that the guest has an allergy (e.g., to pollen, cat hair, etc.). In some embodiments, the processor may use a language analysis technique, such as keyword searching or natural language analysis, to analyze the content of various communications to and from the user of the cleaning robot. In some embodiments, the processor may prepare and send a query for information related to an upcoming event. For example, the clean robot processor may send a follow up message to each guest that accepts an invitation to an upcoming event requesting additional information (e.g., number of guests, allergies, whether children will attend, and other suitable information).

In various embodiments, the processor may determine one or more cleaning parameters for the cleaning robot based on the analyses of the information that is useful in scheduling and/or configuring one or more cleaning operations. In some embodiments, based on the analysis of the user planning information and the user location information, the processor may dynamically determine or adjust one or more aspects of cleaning operations performed by the cleaning robot. For example, the cleaning robot processor may schedule a cleaning operation for a time when people are not present in the structure. As another example, the cleaning robot processor may plan or adjust a cleaning operation (e.g., a type and/or intensity of cleaning) based upon an activity in the structure (that has occurred or is planned) determined by the processor based on a user's schedule information.

In some embodiments, the processor may identify an event for which to schedule a cleaning operation of the cleaning robot. The event may include, for example, a scheduled or future activity or occurrence associated with a user. Non-limiting examples of an event prompting a cleaning operation include a social event (a dinner, a party, etc.), business or personal travel, a meeting, a sporting event, an entertainment event, and other suitable events. In some embodiments, the processor may determine information about the event, such as a date, time, duration, location, type of event, and other such information about the event.

In some embodiments, the processor may use machine learning techniques to draw one or more inferences relevant to scheduling/planning cleaning operations based on the determined information. For example, based on the location of an upcoming social event and the location of the cleaning robot (e.g., within a structure such as a home or a business), the processor may determine a travel time to and from the location of the event within in the structure, and may use this determined information for dynamically scheduling operations of the cleaning robot. As another example, based on the user planning information and/or user location information, the processor may determine that a user has gone to work for the day. Based on such a determination, the processor may determine that the user will likely be away from home for approximately eight hours and use this determined information for dynamically scheduling operations of the cleaning robot. As another example, the processor may make other similar determinations based on the user planning information and/or user location information, such as determining that a user is at a child's sports practice scheduled for 90 minutes, and based on this determination, the processor may dynamically schedule operations of the cleaning robot during this time that humans will not be on the premises.

In some embodiments, the processor may determine a timing for the operation of the cleaning robot based on the determined event. For example, the processor may determine a date, time, time period, duration, or another suitable timing parameter to schedule the operation of the cleaning robot. As another example, the processor may determine a date, time, time period, duration, or another timing parameter to avoid scheduling, or to not schedule, the operation of the cleaning robot.

In some embodiments, the processor may determine the timing for the operation of the cleaning robot based on the analysis of the determined event. In some embodiments, the processor may determine the timing for the operation of the cleaning robot based on the date, time, duration, location, type of event, and other information about the event. For example, the processor may determine the timing to schedule the operation of the cleaning robot for when a person is scheduled to be away from the structure. As another example, the processor may determine the timing to schedule the operation of the cleaning robot for when a structure (e.g., a home, a workplace, a location within a home or workplace, etc.) will be unoccupied. As another example, the processor may determine that no operation of the cleaning robot should be scheduled or that operations of the cleaning robot should be limited during when a user or people are scheduled to be present at or in the structure. In some embodiments, based on the analysis of the determined event, the processor may determine a timing for multiple cleaning operations, or establish a frequency of cleaning operations. For example, based on an upcoming party, the processor may determine schedule operations of the cleaning robot before and after the party, but not during the party. As another example, when there is a recurring event (e.g., a weekly soccer practice), the processor may schedule a recurring cleaning operation (e.g., to clean dirt and mud tracked in from the soccer field) for times following the recurring event.

In some embodiments, the processor may determine one or more locations for the operation of the cleaning robot based on analyses of the user planning information and/or the user location information. In some embodiments, the processor may determine the one or more locations for the operations of the cleaning robot based on the analyses of one or more scheduled or upcoming events. For example, based on an upcoming party that the user is hosting, the processor may determine a foyer, a living room, and/or a guest bathroom for an operation of the cleaning robot. As another example, based on a meeting in a workplace, the processor may determine a conference room for an operation of the cleaning robot. As another example, based on a planned attendance at a sporting event, the processor may determine multiple rooms or locations (e.g., most or all of a house) for an operation of the cleaning robot.

In some embodiments, the processor may alter or adjust a timing and/or location of a regularly scheduled operation of the cleaning robot based on the analysis of user planning information, user location information and/or user communications. By way of illustration, consider the example of a cleaning robot that may be scheduled to regularly clean a structure or a location within a structure (e.g., clean a swimming pool every Saturday). Based on the user planning information, user location information and inferences drawn from user communications and social media, the processor might determine that an event (e.g., a pool party) is scheduled for Friday (i.e., the day before the scheduled cleaning) Then, based on this information, the processor may adjust the schedule operation of the cleaning robot to clean the pool before the scheduled event (e.g., on Thursday).

In some embodiments, the processor may alter or adjust a timing and/or location of other scheduled cleaning robot operations based on user planning information, user location information and inferences drawn from user communications and social media. For example, based on such information, the processor may determine that a guest will be staying for a period of time and schedule cleanings of the guest room to occur prior to arrival and after departure of the guest. As another example, based on user planning information, the processor may determine that a Thursday night cookout is scheduled and in response reschedule a lawn mowing activity to occur prior to the scheduled cookout (e.g., Thursday morning instead of the normal 7 AM Saturday morning mowing scheduled to irritate the neighbors).

In some embodiments, the processor may determine an operation to perform, or may adjust a scheduled type of operation and/or a scheduled timing of an operation, based on the analysis of user planning information, user location information and user communications and social media. For example, the processor may determine that a guest has indicated a cat allergy in an RSVP to an upcoming party and schedule an extra-deep cleaning operation and/or schedule a cleaning operation just prior to the upcoming party (e.g., two hours before the party instead of the day before). As another example, the processor may determine that a guest has indicated a grass allergy (e.g., in a social media message related to an upcoming barbecue), and delay a scheduled grass cutting operation until after the scheduled barbecue in response. As another example, the processor may determine from an RSVP message that children will attend an event, and schedule a cleaning operation for soon after the event in response.

In some embodiments, the processor may determine the one or more locations for cleaning operations based on analyses of the user location information. In some embodiments, the processor may determine the one or more locations for cleaning operations based on a location of a mobile communication device owned by a user. In some embodiments, the processor may determine one or more locations for cleaning operations based on the location of a vehicle associated with a user. In some embodiments, the processor may determine the one or more locations for cleaning operations based on monitored network communication activity over with the external communication network and/or over the internal communication network. For example, the processor may avoid scheduling (i.e., not schedule) cleaning operations of the cleaning robot at a location in response to determining that a mobile communication device is present in that location. As another example, the processor may determine a location for cleaning operation of the cleaning robot (e.g., a user's bedroom) based on a location of the user's vehicle being remote from the structure, indicating that the user is not a home, is at work, etc. As another example, the processor may identify a location for cleaning operations of the cleaning robot in response to determining the location of a user in the structure based on the use of an IoT lighting device in a room determined by monitored network activity (e.g., commands and communication over the network to and from the IoT lighting device).

In some embodiments, the processor may determine one or more combinations of timing and location for the operation of the cleaning robot. For example, the processor may flag a location that is currently in use (e.g., a dining room, a conference room, etc.)—or is scheduled for future use— for an operation of the cleaning robot, and may prevent any operation of the cleaning robot in that location while the location is in use (or is scheduled for use). Further, the robot may determine when the use of the location has ended and may schedule the operation of the cleaning robot in that location for a time after the use of the location has ended. As another example, while a first location is in use (or during a time when the first location is scheduled for use) the processor may schedule an operation of the cleaning robot in a second location, and may prevent the scheduling of an operation of the cleaning robot in the first location during its scheduled use. In various embodiments, based on the determined cleaning parameter(s), the processor of the cleaning robot may generate an instruction for the cleaning robot to schedule an operation of the cleaning robot. In some embodiments, the generated instruction may indicate a timing, location, frequency, and other suitable parameters for the operation of the cleaning robot.

In various embodiments, the processor of the cleaning robot may execute the generated instruction to perform the operation of the cleaning robot.

Various embodiments may be implemented within a cleaning robot operating within a variety of communication systems 100, an example of which is illustrated in FIG. 1. With reference to FIG. 1, the communication system 100 may include a cleaning robot 102, various devices in and around a structure 120, such as a smart lighting device 104, a smart thermostat device 106, and a mobile computing device 108, and a hub device 110. The devices 104-108 illustrated in FIG. 1 are non-limiting examples, and the devices in and around the structure may include a wide range of devices, including IoT devices, capable of communication with the cleaning robot 102 and/or the hub device 110. The hub device 110 may include a wireless communications device 112 that enables wireless communications among the cleaning robot 102, the smart lighting device 104, the smart thermostat device 106, and the mobile computing device 108 via wireless communication links 132, 134, 136, and 138, respectively. The hub device 110 may communicate with the wireless communication device 112 over a wired or wireless communication link 140. A cleaning robot 102 may also communicate directly with and/or monitor wireless communications directly between or among the devices 104-112.

The communication system 100 may also include a communication network 150, a base station 152, a mobile communication device 154, and a vehicle 156. In some embodiments, the hub device 110 may include a router, a gateway, or another suitable device that enables communication with the communication network 150 over a wired or wireless communication link 172. The mobile communication device 154 and the vehicle 156 may communicate with the base station 152 over wireless communication links 176 and 178, respectively. The base station 152 may provide wireless communications to access the communication network 150 over a wired and/or wireless communications backhaul 174. The base station 152 may include base stations configured to provide wireless communications over a wide area (e.g., macro cells), as well as small cells, which may include a micro cell, a femto cell, a pico cell, and other similar network access points.

The communication network 150 may include one or more network elements, such as servers and other similar devices (not illustrated). Network elements may host and provide access to network-based services. For example, one or more such network elements may provide access to a network-based calendar 162, which may be associated with a user and may be a source of user planning information. As another example, one or more network elements may provide access to a social media service 160, which may be associated with the user of the cleaning robot and may also be a source of user planning information. As another example, one or more network elements may provide access to a messaging service 164, such as email, text messaging, instant messaging, or another suitable communication service. The wireless and/or wired communication links 132, 134, 136, 138, 140, 172, 174, 176, and 178 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 132, 134, 136, 138, 140, 172, 174, 176, and 178 include an Institute of Electrical and Electronics Engineers (IEEE) 802.15.4 protocol (such as Thread, Zig-Bee, and Z-Wave), any of the Institute of Electrical and Electronics Engineers (IEEE) 16.11 standards, or any of the IEEE 802.11 standards, the Bluetooth® standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

In various embodiments, the cleaning robot 102 may perform one or more cleaning operations in one or more locations within and proximate to the structure 120. A location may include an interior location of the structure 120 (e.g., a room), an exterior location of the structure 120 (e.g., a porch, a patio, a landing, a balcony, a veranda, and other similar exterior locations), or another location of the structure 120. In some embodiments, the cleaning robot 102 may dynamically manage the scheduling and performance of various operations based on information from sources external to the cleaning robot, including images and/or video information obtained from one or more of the devices 104-108 in and around the structure 120, the hub device 110, the mobile communication device 154, the vehicle 156, social media service 160, and the network calendar 162.

Figure 2:
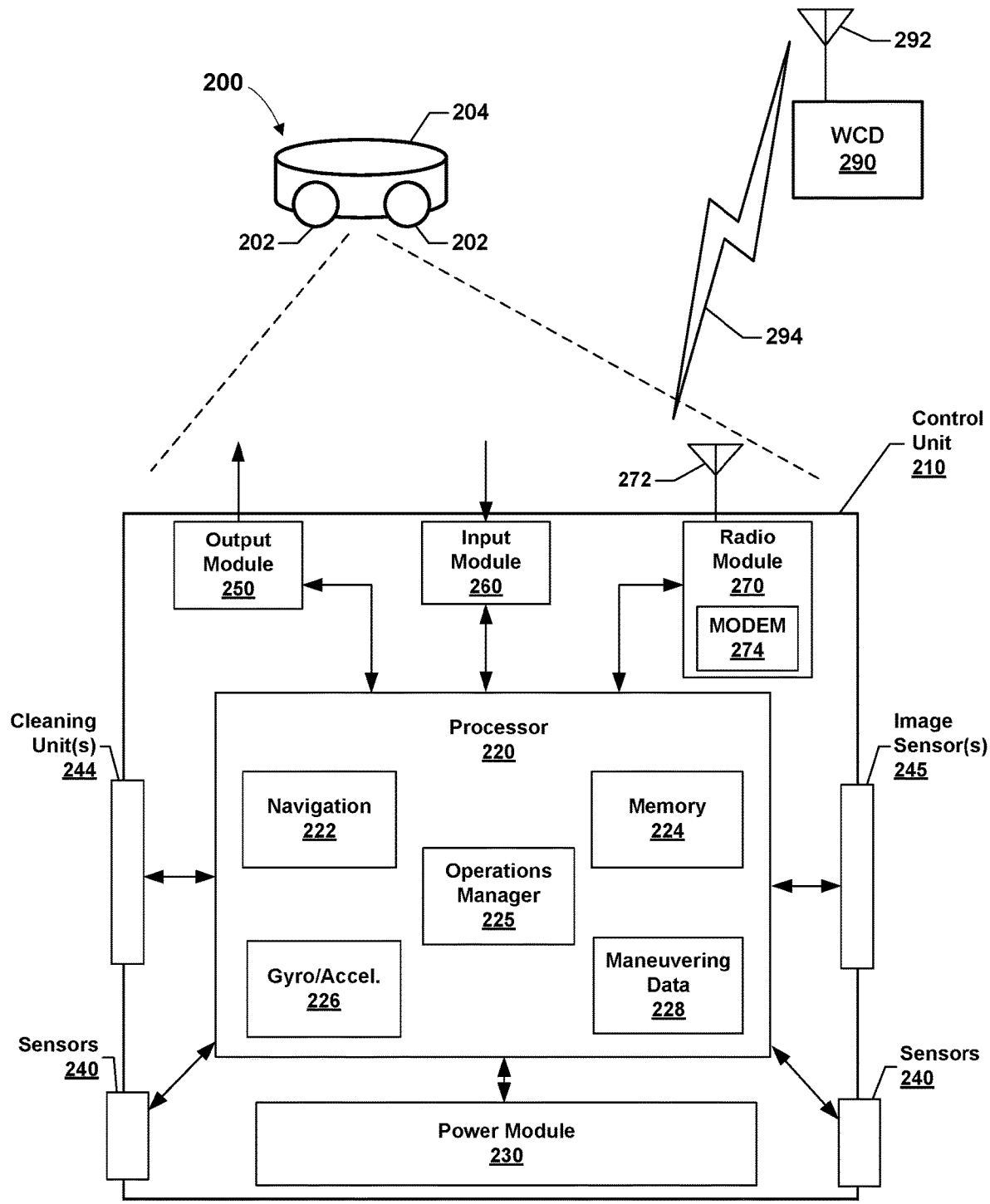
FIG. 2 is a component block diagram illustrating components of a cleaning robot according to various embodiments.

FIG. 2 illustrates an example cleaning robot 200 of a ground vehicle design that utilizes one or more wheels 202 driven by corresponding motors to provide locomotion to the cleaning robot 200. The cleaning robot 200 is illustrated as an example of a cleaning robot that may utilize various embodiments, but FIG. 2 is not intended to imply or require that the claims are limited to wheeled ground cleaning robots. For example, various embodiments may be used with a variety of propulsion mechanisms, body designs, and component configurations, and may be configured to perform operations in a variety of environments, including cleaning robots that maneuver at least partially by flying, and water-borne cleaning robots (e.g., pool cleaning robots).

With reference to FIGS. 1 and 2, the cleaning robot 200 may be similar to the cleaning robot 102. The cleaning robot 200 may include a number of wheels 202 and a body 204. The frame 204 may provide structural support for the motors and their associated wheels 202. For ease of description and illustration, some detailed aspects of the cleaning robot 200 are omitted such as wiring, frame structure interconnects, or other features that would be known to one of skill in the art. While the illustrated cleaning robot 200 has wheels 202, this is merely exemplary and various embodiments may include any variety of components to provide propulsion and maneuvering capabilities, such as treads, paddles, skids, or any combination thereof or of other components.

The cleaning robot 200 may further include a control unit 210 that may house various circuits and devices used to power and control the operation of the cleaning robot 200. The control unit 210 may include a processor 220, a power module 230, sensors 240, one or more cleaning units 244, one or more image sensors 245, an output module 250, an input module 260, and a radio module 270.

The processor 220 may be configured with processor-executable instructions to control travel and other operations of the cleaning robot 200, including operations of various embodiments. The processor 220 may include or be coupled to a navigation unit 222, a memory 224, an operations management unit 225, a gyro/accelerometer unit 226, and a maneuvering data module 228. The processor 220 and/or the navigation unit 222 may be configured to communicate with a server through a wireless communication link to receive data useful in navigation, provide real-time position reports, and assess data.

The maneuvering data module 228 may be coupled to the processor 220 and/or the navigation unit 222, and may be configured to provide travel control-related information such as orientation, attitude, speed, heading, and similar information that the navigation unit 222 may use for navigation purposes. The gyro/accelerometer unit 226 may include an accelerometer, a gyroscope, an inertial sensor, an inertial measurement unit (IMU), or other similar sensors. The maneuvering data module 228 may include or receive data from the gyro/accelerometer unit 226 that provides data regarding the orientation and accelerations of the cleaning robot 200 that may be used in navigation and positioning calculations, as well as providing data used in various embodiments for processing images.

The processor 220 may further receive additional information from one or more image sensors 245 (e.g., a camera, which may be a monocular camera) and/or other sensors 240. In some embodiments, the image sensor(s) 245 may include an optical sensor capable of infrared, ultraviolet, and/or other wavelengths of light. Information from the one or more image sensors 245 may be used for navigation, as well as for providing information useful in controlling cleaning operations. For example, images of surfaces may be used by the processor 220 to determine a level or intensity of clean operations (e.g., brush speed or pressure) to apply to a given location.

The processor 220 may further receive additional information from one or more other sensors 240. Such sensors 240 may also include a wheel rotation sensor, a radio frequency (RF) sensor, a barometer, a sonar emitter/detector, a radar emitter/detector, a microphone or another acoustic sensor, and/or other sensors that may provide information usable by the processor 220 for movement operations as well as navigation and positioning calculations. The sensors 240 may include contact or pressure sensors that may provide a signal that indicates when the cleaning robot 200 has made contact with a surface.

The power module 230 may include one or more batteries that may provide power to various components, including the processor 220, the sensors 240, the cleaning unit(s) 244, the image sensor(s) 245, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The cleaning robot 200 may be controlled through control of the individual motors of the rotors 202 as the cleaning robot 200 progresses toward a destination. The processor 220 may receive data from the navigation unit 222 and use such data in order to determine the present position and orientation of the cleaning robot 200, as well as the appropriate course towards the destination or intermediate sites. In various embodiments, the navigation unit 222 may include a global navigation satellite system (GNSS) receiver system (e.g., one or more global positioning system (GPS) receivers) enabling the cleaning robot 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), access points that use any of a number of short range RATs (e.g., Wi-Fi, Bluetooth, Zigbee, Z-Wave, etc.), cellular network sites, radio station, remote computing devices, other cleaning robots, etc.

The cleaning units 244 may include one or more of a variety of devices that enable the cleaning robot 200 to perform cleaning operations proximate to the cleaning robot 200 in response to commands from the control unit 210. In various embodiments, the cleaning units 244 may include brushes, vacuums, wipers, scrubbers, dispensers for cleaning solution, and other suitable cleaning mechanisms.

The radio module 270 may be configured to receive navigation signals, such as signals from aviation navigation facilities, etc., and provide such signals to the processor 220 and/or the navigation unit 222 to assist in cleaning robot navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the cleaning robot 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a cleaning robot operator, a third party service, or a site communication access point. The cleaning robot 200 may communicate with a server through one or more intermediate communication links, such as a wireless telephony network that is coupled to a wide area network (e.g., the Internet) or other communication devices. In some embodiments, the cleaning robot 200 may include and employ other forms of radio communication, such as mesh connections with other cleaning robots or connections to other information sources.

The processor 220 may receive information and instructions generated by the operations manager 225 to schedule and control one or more operations of the cleaning robot 200, including various cleaning operations. In some embodiments, the operations manager 225 may receive information via the communication link 294 from one or more sources external to the cleaning robot 200.

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
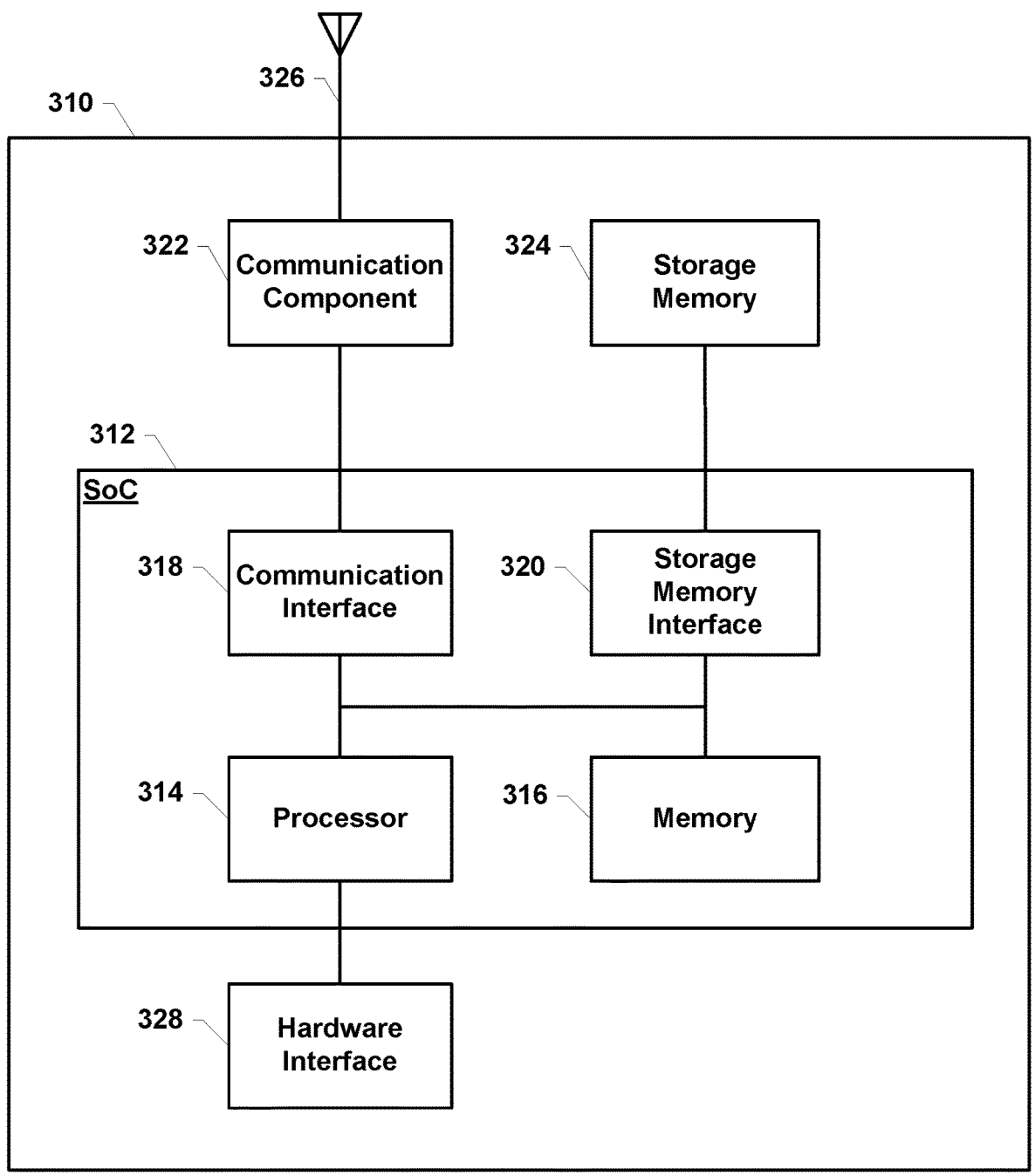
FIG. 3 is a component block diagram illustrating a processing device suitable for use in cleaning robots implementing various embodiments.

While various components of the control unit 210 are illustrated in FIG. 2 as separate components, some or all of the components (e.g., the processor 220, the output module 250, the radio module 270, and other units) may be integrated together in a single processing device 310, an example of which is illustrated in FIG. 3.

With reference to FIGS. 1-3, the processing device 310 may be configured to be used in a cleaning robot (e.g., the cleaning robot 102 and 200) and may be configured as or including a system-on-chip (SoC) 312. The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a cleaning robot. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with an SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

Figure 4:
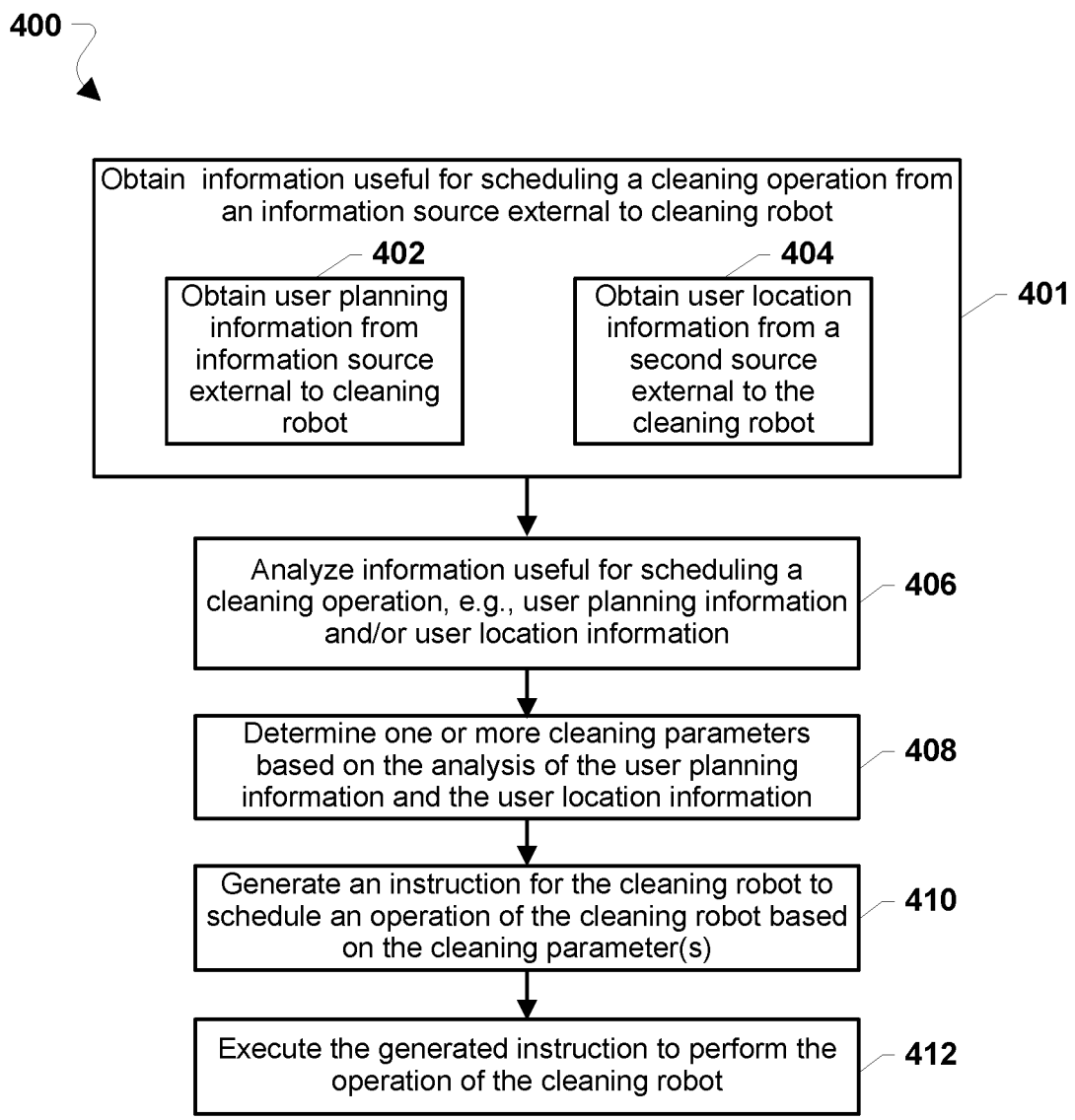
FIG. 4 is a process flow diagram illustrating a method of managing cleaning robot behavior according to various embodiments.

FIG. 4 illustrates a method 400 of managing cleaning robot behavior according to various embodiments. With reference to FIGS. 1-4, a processor of a cleaning robot (e.g., the processor 220, the processing device 310, the SoC 312, and/or the like and hardware components and/or software components of the cleaning robot may obtain information from one or more sources external to the cleaning robot and dynamically schedule and perform various cleaning robot operations.

In block 401, the processor of the cleaning robot may obtain information that is useful in scheduling and/or configuring one or more cleaning operations. Such external sources of information may include access to user planning information (e.g., calendars) as in block 402, user location information (e.g., user smartphone location) as in block 404, and/or user communications or social media services.

In some embodiments the processor of the cleaning robot may obtain user planning information from an information source external to the cleaning robot in block 402. For example, the cleaning robot may be configured to communicate with a communications network (e.g., the communication network 150), e.g., via a wireless communications device (e.g., the wireless communication device 112). In some embodiments, the processor may obtain user planning information from a network element (e.g., a server) of or accessible via the communication network. For example, the processor may obtain calendar information from a calendar data file associated with a user that is accessible via the network element (e.g., the network calendar 162). As another example, the processor may obtain scheduled or future event information from a social media service (e.g., the social media service 160) associated with the user of the cleaning robot. As another example, the processor may obtain information about a scheduled or future event from the content of messages to and from the user accessed via a messaging service (e.g., the messaging service 164). As another example, the processor may obtain user planning information from a computing device, such as a personal computer or mobile computing device (e.g., the computing device 108) that is accessible via a local communications network, such as a home network, an Internet of Things (IoT) network, or another suitable communications network. As another example, the processor may obtain user planning information from a mobile computing device that is accessible via an external communication network (e.g., the mobile computing device 154). Other examples of computing devices that may provide user planning information to the processor of the cleaning robot are also possible.

In some embodiments, the processor of the cleaning robot may obtain user location information from a second source external to the cleaning robot in block 404. In some embodiments, the cleaning robot may obtain location information from or about a device that is typically closely associated with a location of a user. For example, the processor may obtain location information of the user's mobile computing device (e.g., the mobile computing devices 108, 154). As another example, the processor may obtain location information from or about a vehicle associated with the user (e.g., the vehicle 156).

In some embodiments, the processor may determine the user's location information by monitoring network communication activity. In some embodiments, the processor may monitor network communication activity from a location with an external communication network (e.g., via the hub device 110). For example, the processor may communicate with, and may monitor network traffic passing through, a communication hub device, a router, a gateway, or another suitable network device. In some embodiments, the processor may determine the user location information based on the monitored network communication activity with the external communication network. For example, the processor may detect Internet use, uploading or downloading of information, streaming of media, network audio or video communications (e.g., VoIP communications, real-time video chatting, or other similar communications), or another suitable network usage. In some embodiments, the processor may determine whether a user or users are present at a location based on the monitored network communication activity with the external communication network.

In some embodiments, the processor may determine the user's location by monitoring network communication activity of an internal communication network (e.g., over a smart home network). Such internal communication network traffic may be generated by the use of a smart appliance or smart device, such as a smart lighting device, smart thermostat, smart fan or air circulator, an IoT device, or another suitable device. The internal communication network traffic may include machine-to-machine communications over the internal communication network, communications passing through, a communication hub device, a router, a gateway, or another suitable network device, and/or direct communications between or among devices that do not pass through a communication hub device.

In block 406, the processor of the cleaning robot may analyze the information useful for scheduling a cleaning operation, such as user planning and related information obtained in block 402 and user location information obtained in block 404. In some embodiments, the processor of the cleaning robot may employ one or more analysis processes to analyze the user planning information and the user location information, such as one or more machine learning techniques. In some embodiments, the processor may generate and store in memory one or more analyses of such obtained information. In some embodiments, the processor may apply one or more machine learning techniques to the determined information to determine an upcoming event for one or more users, a location for one or more users, and other information determinable from the user planning information and the user location information. In block 408, the processor may determine one or more cleaning parameters for the cleaning robot based on the analysis of the user planning information and the user location information. In some embodiments, the processor may dynamically determine or adjust one or more aspects of cleaning operations to be performed by the cleaning robot based on the analyses of the user planning information and/or user location information.

In block 410, the processor of the cleaning robot may generate an instruction for the cleaning robot to schedule a cleaning operation of the cleaning robot based on the determined one or more cleaning parameters). In some embodiments, the generated instruction may indicate a timing, location, frequency, and other suitable parameters for the cleaning operation of the cleaning robot.

In block 412, the processor of the cleaning robot may execute the generated instruction to perform the cleaning operation of the cleaning robot.

Figure 5:
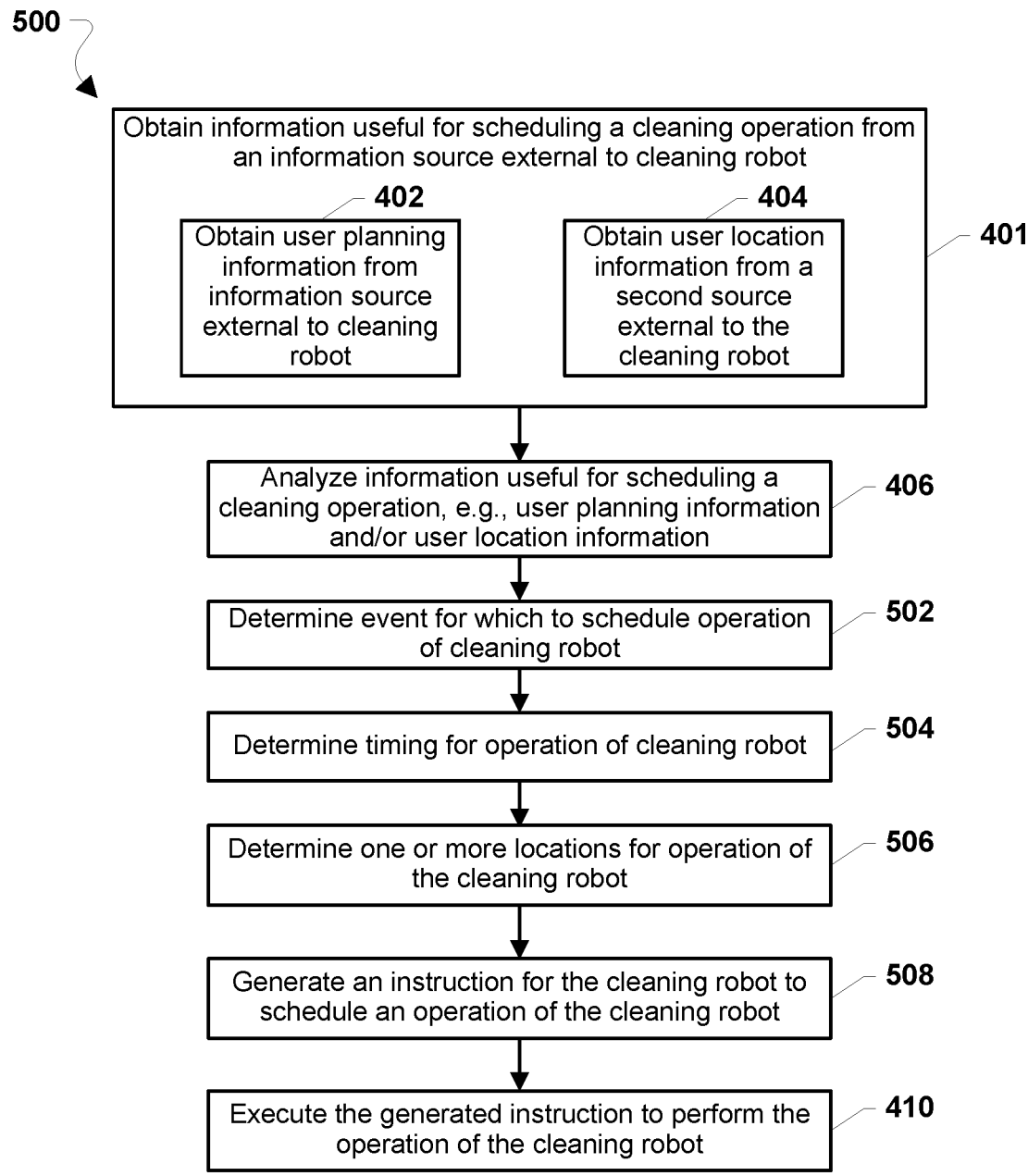
FIG. 5 is a process flow diagram illustrating a method of managing cleaning robot behavior according to various embodiments.

FIG. 5 illustrates a method 500 of managing cleaning robot behavior according to various embodiments. With reference to FIGS. 1-5, a processor of a cleaning robot (e.g., the processor 220, the processing device 310, the SoC 312, and/or the like and hardware components and/or software components of the cleaning robot may obtain information from one or more sources external to the cleaning robot and dynamically schedule and perform various cleaning robot operations. In blocks 401, 402, 404, 406, and 410, the processor of the robotic vehicle may perform operations of like-numbered blocks of the method 400 as described.

In block 406, the processor of the cleaning robot may analyze the information that is useful in scheduling and/or configuring one or more cleaning operations, such as user planning and related information obtained in block 402 and/or user location information obtained in block 404.

In block 502, the processor may determine an event for which a cleaning operation of the cleaning robot may be required or scheduled. The event may include, for example, a scheduled or future activity or occurrence associated with a user. Examples of the event may include a social event (a dinner, a party, etc.), business or personal travel, a meeting, a sporting event, an entertainment event, and other suitable events. In some embodiments, the processor may determine information about the event, such as a date, time, duration, location, type of event, and other such information about the event. In some embodiments, the processor may make one or more inferences based on the determined information. For example, based on the location of an upcoming social event and the location of the cleaning robot, the processor may determine a travel time to and from the event, and may use this information for dynamically scheduling operations of the cleaning robot.

In block 504, the processor may determine a timing for the operation of the cleaning robot based on the determined event. For example, the processor may determine a date, time, time period, duration, or another timing parameter suitable for scheduling a cleaning operation of the cleaning robot. As another example, the processor may determine a date, time, time period, duration, or another timing parameter to avoid scheduling, or to not schedule, a cleaning operation of the cleaning robot.

In some embodiments, the processor may determine the timing for the cleaning operation of the cleaning robot based on the analysis of the determined event. In some embodiments, the processor may determine the timing for the cleaning operation of the cleaning robot based on the date, time, duration, location, type of event, and other such information about the event. For example, the processor may determine the timing to schedule the operation of the cleaning robot for when a person is scheduled to be not present. As another example, the processor may determine the timing to schedule the operation of the cleaning robot for when a location (e.g., a home, a workplace, a location within a home or workplace, or another location within a structure) will be unoccupied. As another example, the processor may determine the timing to schedule no operation of the cleaning robot, or to limit operations of the cleaning robot, during a time when a person or people are scheduled to be present at or in a location. In some embodiments, the processor may determine a timing for multiple cleaning operations, or establish a frequency of cleaning operations based on the analysis of the identified event. For example, based on information regarding an upcoming party, the processor may schedule cleaning operations of the cleaning robot before and after the party, but not during the party. As another example, based on a recurring event the processor may schedule a recurring cleaning operation.

In block 506, the processor may determine one or more locations for the cleaning operation of the cleaning robot based on the based on the analysis of the user planning information and the user location information. In some embodiments, the processor may determine the one or more locations for the operation of the cleaning robot based on the analysis of one or more scheduled or upcoming events. For example, based on an upcoming party that the user is hosting, the processor may determine a foyer, a living room, and/or a guest bathroom for an operation of the cleaning robot. As another example, based on a meeting in a workplace, the processor may determine a conference room for an operation of the cleaning robot. As another example, based on a planned attendance at a sporting event, the processor may determine multiple rooms or locations (e.g., most or all of a house) for an operation of the cleaning robot.

In some embodiments, the processor may determine the one or more locations based on the analysis of the user location information. In some embodiments, the processor may determine the one or more locations based on a location of a mobile communication device. In some embodiments, the processor may determine the one or more locations based on a vehicle associated with a user. In some embodiments, the processor may determine the one or more locations based on monitored network communication activity over with the external communication network and/or over the internal communication network.

For example, the processor may a location to avoid scheduling, or to not schedule, a cleaning operation of the cleaning robot, based on a determination that a mobile communication device is present in that location. As another example, the processor may determine a location for a cleaning operation of the cleaning robot (e.g., a user's bedroom) based on a location of the user's vehicle (e.g., the vehicle is not a home, is at work, etc.) As another example, the processor may identify a location for a cleaning operation of the cleaning robot based on detecting a use of an IoT lighting device in a room based on monitored network activity (e.g., commands and communication over the network to and from the IoT lighting device).

In some embodiments, the processor may determine one or more combinations of timing and location for a cleaning operation of the cleaning robot. For example, the processor may flag a location that is currently in use (e.g., a dining room, a conference room, etc.)—or is scheduled for future use—for a cleaning operation of the cleaning robot, and may prevent any operations of the cleaning robot in that location while the location is in use (or is scheduled for use). Further, the robot may determine when the use of the location has ended, and may schedule a cleaning operation of the cleaning robot in that location for a time after the use of the location has ended. As another example, while a first location is in use (or during a time when the first location is scheduled for use) the processor may schedule a cleaning operation of the cleaning robot in a second location, and may prevent the scheduling of a cleaning operation of the cleaning robot in the first location during its scheduled use.

In some embodiments, the processor may determine an event, a timing, or a location for an operation of the cleaning robot based on a combination of user planning information and user location information. In some embodiments, based on the analysis of user planning information and user location information, the processor may dynamically alter or modify a previously-scheduled cleaning operation. In some embodiments, the processor may delay or prevent a cleaning operation of the robot cleaner while the user is home based on such determinations. In some embodiments, the processor may determine a location and/or timing of a cleaning operation in one or more locations in the structure where the user is not located based on such determinations. In some embodiments, the processor may schedule performance of a cleaning operation of the robot cleaner while the user is not home based on such determinations.

For example, based on the analysis of user planning information and user location information, the processor might determine that while the user calendar information indicates that the user should be away, the operation of IoT lighting systems and network activity (e.g., Internet activity) indicates that the user is home. In this situation, the robot cleaner processor may preempt a previously planned cleaning operation.

As another example, based on the analysis of user planning information and user location information, the processor may determine that while user calendar information indicates that the user should be home, the location of a vehicle and/or a mobile computing device associated with the user obtained by an external source of such information indicates that the user is at another location. In this situation, the robot cleaner processor may initiate a cleaning operation while the user is not home.

As another example, according to a cleaning schedule the cleaning robot is scheduled to perform a cleaning operation every Wednesday morning; however, the processor may determine that the user planning information (e.g., the network calendar 162) indicates that that the user is away all week. In this situation, the processor may correlate the user planning information with user location information to confirm that the user is indeed away (i.e., the determined location of the user's mobile computing device and/or the vehicle are at another location). In this way, the processor may cancel the otherwise-scheduled weekly cleaning operation as unnecessary.

In block 508, based on the one or more determined cleaning parameters, the processor of the cleaning robot may generate an instruction for the cleaning robot to schedule a cleaning operation of the cleaning robot. In some embodiments, the processor may generate the instruction based on the analysis of the user planning information and/or the user location information. In some embodiments, the generated instruction may indicate a timing, location, frequency, and other suitable parameters for a cleaning operation of the cleaning robot.

In block 410, the processor of the cleaning robot may execute the generated instruction to perform the cleaning operation of the cleaning robot, as described.

Figure 6:
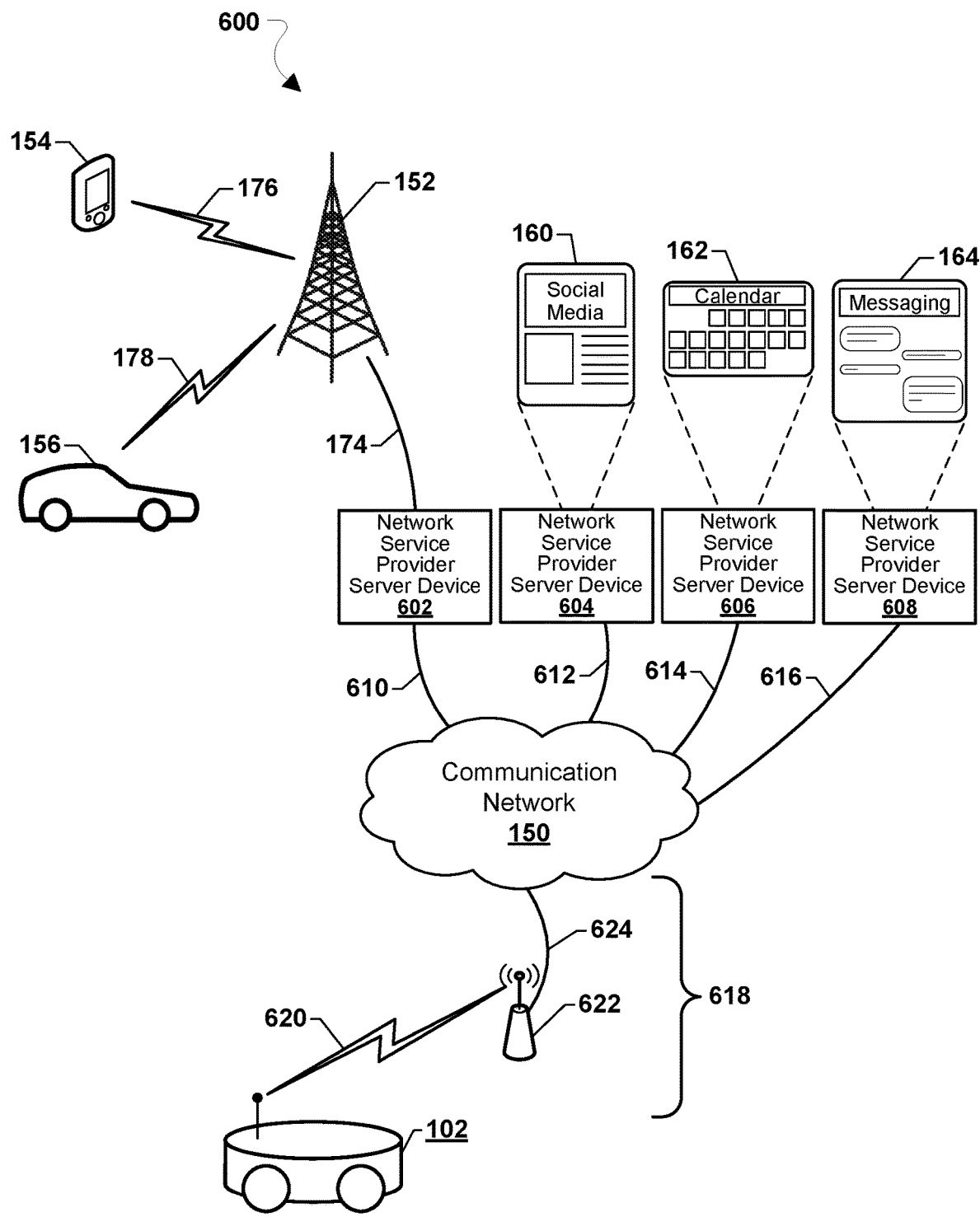
FIG. 6 is a system block diagram illustrating a communication system by which a cleaning robot may obtain information that is useful in scheduling and/or configuring one or more cleaning operations from an external information source.

FIG. 6 is a system block diagram illustrating a communication system 600 by which a cleaning robot may obtain information that is useful in scheduling and/or configuring one or more cleaning operations from an external information source. With reference to FIGS. 1-6, a processor of a cleaning robot 102 (e.g., the processor 220, the processing device 310, the SoC 312, and/or the like and hardware components and/or software components of the cleaning robot) may obtain information from one or more sources external to the cleaning robot that are associated with the user but not necessarily connected to the same network as the cleaning robot, such as a user's mobile device or automobile.

User devices like mobile devices (e.g., smartphones 154) and automobiles 156 may communicate with communication networks that are supported by network service providers. Network service providers may use server devices 602, 604, 606, 608 to maintain data and manage communications with such user devices via a communication network 150 over respective communication links 610, 612, 614, 616.

A cleaning robot 102 may communicate with an extended communication network 150 (e.g., the Internet) via a local network 618, which may include a wireless communication link 620 (e.g., WiFi or Bluetooth signals) to a home router 622 (e.g., a WiFi or Bluetooth router) that has a network connection 624 to the communication network. Through the local network 616 to the extended communication network 150, and the processor of the cleaning robot 102 may communicate with the network service provider server device(s) 602, 604, 606 such as using standard Internet protocols or provider-specific or application-specific protocols (e.g., as provided by an Application Programming Interface (API)). The communication links and networks 610, 612, 614, and 616 may be similar to the wireless and/or wired communication links 132, 134, 136, 138, 140, 172, 174, 176, and 178 described with reference to FIG. 1.

In some embodiments, each network service provider server device 602, 604, 606, 608 may be a network element configured to provide a network-accessible service, such as access to information from or about the mobile computing device 154, the vehicle 156, the social media service 160, the network-based calendar 162, and/or the messaging service 164. A cellular network service provider server device 602 may be operated by a cellular communication service provider, and may be configured to provide location information about the mobile computing device 154 and/or the vehicle 156 under defined circumstances. For example, the network service provider server device 602 may be configured to provide such information to a cleaning robot processor in response to a query from the processor, or automatically without a query, such as in a "push notification" or another suitable message to the processor. A network service provider server device 604, 606, 608 may similarly provide information from a user's social media service, calendar, or messages/messaging service to a cleaning robot processor automatically and/or in response to a query.

In some embodiments, the network service provider server devices 602, 604, 606, 608 may provide limited and/or secured access to information relevant to a user or owner of a cleaning robot, such as to protect user/owner private information. In some cases, the network service provider server devices 602, 604, 606, 608 may require appropriate access credentials, tokens, certificates, and the like to request or access the information. In some cases, the network service provider server devices 602, 604, 606, 608 may employ a data transfer authorization protocol, such as OAuth, OAuth2, Javascript Object Signing and Encryption (JOSE), and JavaScript Object Notation (JSON) Web Token (JWT), to control access to the user/owner information. In some embodiments, the cleaning robot processor may be configured with appropriate software and/or suitable credentials to satisfy privacy protections and enable the processor to access information available from the network service provider server devices 602, 604, 606, 608.

Figure 7:
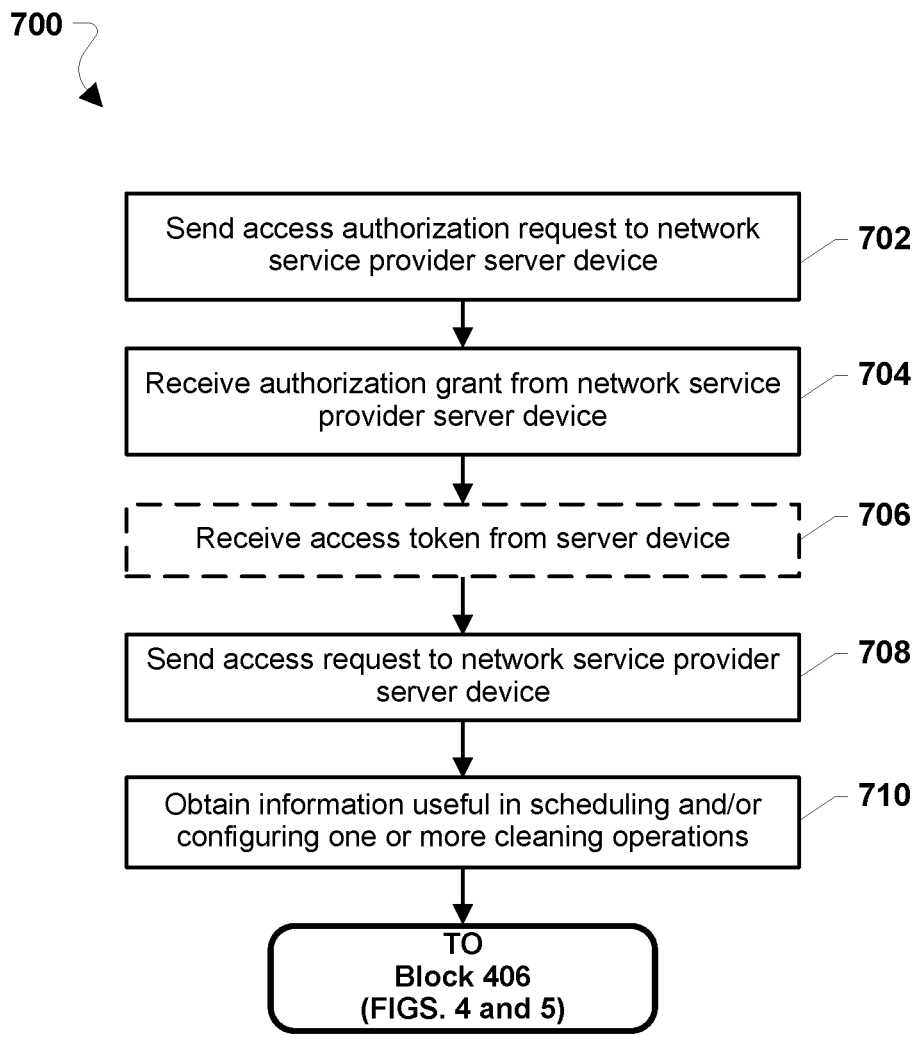
FIG. 7 is a process flow diagram illustrating a method of obtaining information that is useful in scheduling and/or configuring one or more cleaning operations from an external information source.

FIG. 7 illustrates a method 700 of obtaining user or owner information from an external information source that may be useful in scheduling and/or configuring one or more cleaning operations according to some embodiments. With reference to FIGS. 1-7, a processor of a cleaning robot (e.g., the processor 220, the processing device 310, the SoC 312, and/or the like and hardware components and/or software components of the cleaning robot) may obtain information from one or more sources external to support dynamic scheduling and performance of various cleaning robot operations.

In block 702, the processor of the cleaning robot may send an access authorization request to a network service provider server device (e.g., the server device 602, 604, 606, 608), such a via network communication links as illustrated in FIG. 6. In some embodiments, the access authorization request may include user credentials (e.g., a username and password, an access token, an access key, or another suitable credential) or other information that will serve to authenticate the request for information to the network service provider server device.

In block 704, the processor may receive an authorization grant from the network service provider server device. In some embodiments, the authorization grant may include a limited access authorization, such as read-only access to the requested information.

In optional block 706, the processor may receive an access token from a server device that may be used to obtain requested information from a server where such information is stored. In some cases, the server device from which the access token is received may be the network service provider server device. In some cases, the server device that provides the access token may be an authorization server or another server device different from the network service provider server device. In some embodiments, the processor of the cleaning robot may send a request including the authorization grant to the authorization server and receive the access token in response to the message to the authorization server.

In block 708, the processor may send an access request to the network service provider server device. In some embodiments, the access request may include a request for particular information, such as user planning information and/or user location information. In some embodiments, the processor may include the access token received in optional block 706 in the access request sent in block 708.

In block 710, the processor may receive the requested information useful in scheduling and/or configuring one or more cleaning operations from the network service provider server device. Such information may include user planning information and/or user location information. Examples of the operations that may be performed in block 710 include the operations of blocks 402 and 404 of the method 400 as described.

The processor of the cleaning robot may perform the operations in block 406 of the method 400 as described.

The method 700 provides a nonlimiting example of methods and algorithms that the processor of the cleaning robot 102 may use to obtain information from external sources (e.g., network service provider server devices 602, 604, 606, 608) that may be useful in scheduling and/or configuring one or more cleaning operations from the. Examples of such information include user planning information (e.g., calendar data files, social calendars, etc.), user location information of devices normally associated with a user, such as smartphones, automobiles, etc. Other methods of obtaining such information from external sources may also be implemented.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, and 700 may be substituted for or combined with one or more operations of the methods 400, 500, and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of managing cleaning behavior by a cleaning robot, comprising:
    obtaining, by a processor of a cleaning robot from an information source external to the cleaning robot, information for scheduling or modifying a cleaning operation, wherein the information comprises user location information that is based on a location of a vehicle associated with a user;
    analyzing, by the processor, the information for scheduling or modifying a cleaning operation;
    determining, by the processor, one or more cleaning parameters for the cleaning robot based on the analysis of the information useful for scheduling or modifying a cleaning operation;
    generating, by the processor, an instruction for the cleaning robot to schedule an operation of the cleaning robot based on the one or more cleaning parameters; and
    executing, by the processor, the generated instruction to perform the operation of the cleaning robot.

2. The method of claim 1, wherein determining the one or more cleaning parameters for the cleaning robot based on the analysis of the user location information comprises:
    determining, by the processor, a timing for the operation of the cleaning robot based on the analysis of the user location information.

3. The method of claim 1, wherein generating an instruction for the cleaning robot to schedule an operation of the cleaning robot based on the one or more activity parameters comprises:
    determining one or both of a timing or a location for the operation of the cleaning robot based on the one or more cleaning parameters.

4. A robotic vehicle, comprising:
    a memory; and
    a processor coupled to the memory and configured with processor-executable instructions to:
        obtain from an information source external to the cleaning robot information for scheduling or modifying a cleaning operation, wherein the information comprises user location information that is based on a location of a vehicle associated with a user;
        analyze the information for scheduling or modifying a cleaning operation;
        determine one or more cleaning parameters for the cleaning robot based on the analysis of the information useful for scheduling or modifying a cleaning operation;
        generate an instruction for the cleaning robot to schedule an operation of the cleaning robot based on the one or more cleaning parameters; and
        execute the generated instruction to perform the operation of the cleaning robot.

5. The robotic vehicle of claim 4, wherein the processor is further configured with processor-executable instructions to:
    determine a timing for the operation of the cleaning robot based on the analysis of the user location information.

6. The robotic vehicle of claim 4, wherein the processor is further configured with processor-executable instructions to:
    determine one or both of a timing or a location for the operation of the cleaning robot based on the one or more cleaning parameters.

7. A non-transitory, processor-readable medium having stored thereon processor-executable instructions configured to cause a processor of a cleaning robot to perform operations comprising:

obtaining from an information source external to the cleaning robot information for scheduling or modifying a cleaning operation, wherein the information comprises user location information that is based on a location of a vehicle associated with a user;

analyzing the information for scheduling or modifying a cleaning operation;

determining one or more cleaning parameters for the cleaning robot based on the analysis of the information useful for scheduling or modifying a cleaning operation;

generating an instruction for the cleaning robot to schedule an operation of the cleaning robot based on the one or more cleaning parameters; and executing the generated instruction to perform the operation of the cleaning robot.

8. A robotic vehicle, comprising:

a memory; and a processor coupled to the memory and configured with processor-executable instructions to:

obtain from an information source external to the cleaning robot information for scheduling or modifying a cleaning operation, wherein the information comprises user planning information;

analyze the user planning information to identify an event for which a cleaning operation should be scheduled;

determine one or more cleaning parameters for the cleaning robot based on the identified event;

generate an instruction for the cleaning robot to schedule an operation of the cleaning robot based on the one or more cleaning parameters; and execute the generated instruction to perform the operation of the cleaning robot.

9. The robotic vehicle of claim 8, wherein the processor is further configured with processor-executable instructions to:

determine a timing for the operation of the cleaning robot based on the identified event.

10. The robotic vehicle of claim 9, wherein the processor is further configured with processor-executable instructions to:

analyze user communications information to obtain further information useful for scheduling or modifying a cleaning operation related to the identified event; and modify the cleaning operation based upon the obtained further information.

11. A robotic vehicle, comprising:

a memory; and a processor coupled to the memory and configured with processor-executable instructions to:

obtain from an information source external to the cleaning robot information for scheduling or modifying a cleaning operation, wherein the information comprises user location information based on monitored communication activity with an external or internal communication network;

analyze the information useful for scheduling or modifying a cleaning operation;

determine one or more cleaning parameters for the cleaning robot based on the analysis of the information useful for scheduling or modifying a cleaning operation;

generate an instruction for the cleaning robot to schedule an operation of the cleaning robot based on the one or more cleaning parameters; and execute the generated instruction to perform the operation of the cleaning robot.

12. The robotic vehicle of claim 11, wherein the processor is further configured with processor-executable instructions to:

determine one or both of a timing or a location for the operation of the cleaning robot based on the one or more cleaning parameters.

13. A robotic vehicle, comprising:

a memory; and a processor coupled to the memory and configured with processor-executable instructions to:

obtain from an information source external to the cleaning robot information for scheduling or modifying a cleaning operation, wherein the information comprises user location information;

analyze the information useful for scheduling or modifying a cleaning operation;

determine one or more cleaning parameters for the cleaning robot based on the analysis of the information useful for scheduling or modifying a cleaning operation;

generate an instruction for the cleaning robot to schedule an operation of the cleaning robot based on the one or more cleaning parameters;

determine a timing for the operation of the cleaning robot based on the analysis of the user location information; and execute the generated instruction to perform the operation of the cleaning robot.

14. The robotic vehicle of claim 13, wherein the processor is further configured with processor-executable instructions to:

determine a location for the operation of the cleaning robot based on the one or more cleaning parameters;

wherein the obtained user location information is based on a location of a mobile computing device associated with a user.

15. The robotic vehicle of claim 13, wherein the user location information is based on a location of a mobile computing device associated with a user or a location of a vehicle associated with the user.

* * * * *